（12) United States Patent
Fagebaume et al.

(10) Patent No.: US 6,435,240 B1
(45) Date of Patent: Aug. 20, 2002

(54) PROCESS FOR THE ELECTROCHEMICAL PRODUCTION OF A CARBON-CONTAINING MATERIAL WHOSE SURFACE IS MODIFIED WITH ORGANIC GROUPS, AND USE OF THE MODIFIED MATERIAL

(75) Inventors: Olivier Fagebaume, Paris; Jean Pinson, Fontenay sous Bois; Jean-Michel Saveant, Paris, all of (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 0 days.

(21) Appl. No.: 09/383,959

(22) Filed: Aug. 27, 1999

Related U.S. Application Data

(63) Continuation of application No. PCT/FR98/00594, filed on Mar. 25, 1998.

(30) Foreign Application Priority Data

Mar. 27, 1997 (FR) .............................................. 97 03769

(51) Int. Cl.[7] .................................................. C25D 11/00
(52) U.S. Cl. ........................ 156/349; 534/885; 534/553; 534/559; 427/402; 427/419.1
(58) Field of Search ................................ 534/885, 553, 534/559, 545, 523, 838, 850; 156/349; 427/402

(56) References Cited

U.S. PATENT DOCUMENTS 5,554,739 A * 9/1996 Belmont

FOREIGN PATENT DOCUMENTS

EP   0 569 503 B1   11/1993

OTHER PUBLICATIONS

Früchtel and Jung, "Organic Chemistry on Solid Supports," Angew. Chem. Int. Ed. Engl. 1996, 35, 17–42.

Thompson and Ellman, "Synthesis and Applications of Small Molecule Libraries," Chem. Rev. 1996, 96, 555–600.

Hermkens, Ottenheijm, and Rees, "Solid–Phase Organic Reactions: A Review of the Recent Literature," Tetrahedron Report No. 394, Tetrahedron vol. 52, No. 13, pp. 4527–4554, 1996.

Hermkens, Ottenheijm, and Rees, "Solid–Phase Organic Reactions II: A Review of the Literature Nov. 95–Nov. 96," Tetrahedron Report No. 418, Tetrahedron vol. 53, No. 16, pp. 5643–5678, 1997.

* cited by examiner

Primary Examiner—Rich Weisberger
(74) Attorney, Agent, or Firm—Finnegan, Henderson, Farabow, Garrett & Dunner LLP

(57) ABSTRACT

A method for producing by electrochemical reduction a carbon-containing material with its surface modified by organic groups, in particular functionalized organic groups, contacting the carbon-containing material with an organic diazonium salt in solvent, optionally in the presence of an electrolyte; negative polarisation of the carbon-containing material relative to an anode also in contact with an electrolyte solution separate from the diazonium salt solution. The electrochemical reduction is carried out on an organic diazonium salt in protic solvent in an acid medium.

25 Claims, 7 Drawing Sheets

Figure 1:
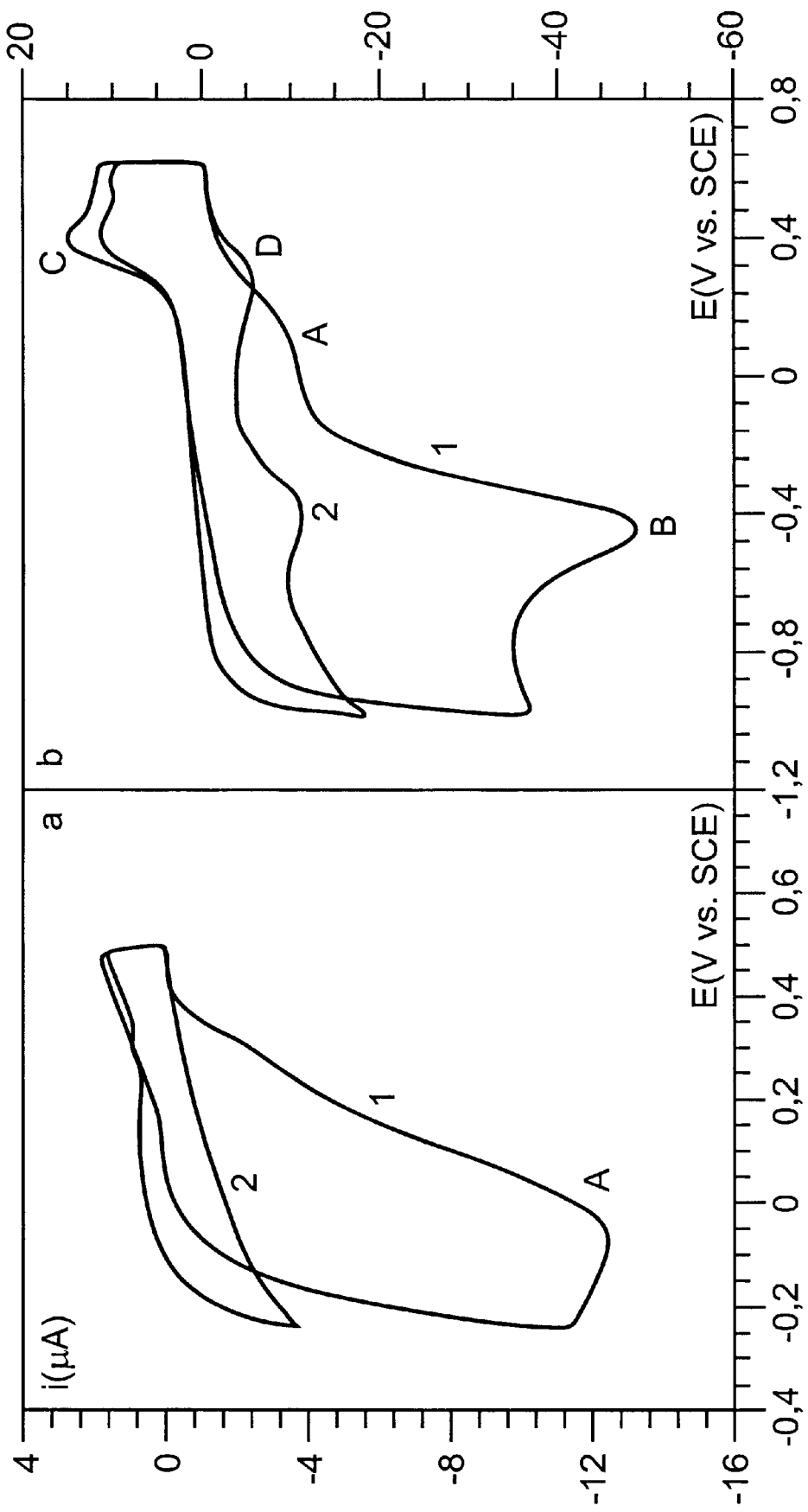

PROCESS FOR THE ELECTROCHEMICAL PRODUCTION OF A CARBON-CONTAINING MATERIAL WHOSE SURFACE IS MODIFIED WITH ORGANIC GROUPS, AND USE OF THE MODIFIED MATERIAL

This application is a continuation of International Application No. PCT/FR98/00594, filed Mar. 25, 1998, the content of which is incorporated herein by reference.

The present invention relates to a novel process for preparing, by electrochemical reduction, a carbon-containing material whose surface is modified with organic groups, in particular functionalized organic groups, this process comprising placing the carbon-containing material in contact with organic diazonium salt in solvent, optionally in the presence of an electrolyte, and negative polarization of the carbon-containing material relative to an anode which is also in contact with a solution of the said organic diazonium salt or in contact with an electrolytic solution separated by a suitable separator for the solution of the said salt.

The invention also relates to the modified carbon-containing materials obtained by the said process and to the use of these carbon-containing materials, in particular for the preparation of composite materials or for carrying out chemical or biological reactions, or for the complexation of metals.

European patent EP-B-569,503 has already described a process for preparing a carbon-containing material whose surface is modified with aromatic groups, in particular functionalized aromatic groups, by electrochemical reduction.

This process is characterized in that it consists in binding an aromatic group to the surface of this material by electrochemical reduction of a diazonium salt comprising this aromatic group, by placing the carbon-containing material in contact with a solution of the diazonium salt in an aprotic solvent and negatively polarizing the carbon-containing material relative to an anode which is also in contact with the diazonium salt solution.

This document furthermore indicates that, in order for the electrochemical reduction of the diazonium salt to lead to binding of the aromatic group of this salt to the surface of the carbon-containing material, it is necessary to carry out the reduction in an aprotic medium which contains neither any nucleophilic compounds nor any ethylenic compounds nor any species capable of reacting with the neutral radical faster than this radical binds to the carbon-containing surface, and to perform the process at a potential which is more negative than the reduction potential of the diazonium salt.

It has now been found, unexpectedly, that the use of this process in protic solvent in acidic medium leads to the binding of an organic group to the surface of the carbon-containing material.

The process according to the invention is thus characterized in that the electrochemical reduction is carried out on an organic diazonium salt in protic solvent in acidic medium.

The electrochemical reduction can be represented schematically according to the following reaction:

$$RN_2^+ + e^- \rightarrow RN_2^\bullet \rightarrow R^\bullet + N_2$$

R being an organic residue.

The residue R binds to a carbon atom at the surface of the carbon-containing material. The covalent bond formed is of the type: carbon of the carbon-containing material-carbon of the organic residue.

According to the process of the invention, the cathode potential is set at a value such that the neutral radical $R^\bullet$ is not reduced and does not give a carbanion. The potential should thus be adjusted to a value which is not too negative, in order to stabilize the neutral radical $R^\bullet$.

It will be noted that the term "residue" denotes the organic part of the diazonium.

It is understood that the invention covers all diazonium salts whose residues R in radical form will be stable enough to bind to a carbon of the carbon-containing material.

The term "group R" will denote the residue R bound to the carbon-containing material, it being understood that the group R will have a broader meaning than the residue R due to the subsequent chemical conversions which it may undergo, as will be understood in the light of the description which follows.

The invention relates in particular to a process characterized in that the diazonium salt corresponds to the formula:

$$ArN_2^+X^- \qquad (I)$$

in which:

Ar is an optionally substituted $C_6$–$C_{14}$ aromatic residue or an optionally substituted heteroaromatic residue of 5 to 14 atoms, comprising one or more hetero atoms chosen from oxygen, nitrogen, sulphur and phosphorus, $X^-$ is an anion chosen from halogens, sulphates, phosphates, perchlorates, tetrafluoroborates, carboxylates and hexafluorophosphates.

The term "aromatic residue" means any residue comprising one or more $C_6$–$C_{14}$ fused or independent benzenic nuclei known per se. Non-limiting examples which may be mentioned are phenyl, naphthyl and anthryl nuclei, triple-fused nuclei, biphenyl nuclei, etc.

The term "heteroaromatic residue" means any aromatic heterocycle comprising one or more hetero atoms such as N, O, S or P, in particular comprising 5 to 14 atoms.

In fact, it is understood that the invention is not limited to specific compounds, but, on the contrary, extends to any diazonium salt which can be reduced to give a neutral radical $Ar^\bullet$.

Among the aromatic residues which may be mentioned, by way of example, are aromatic residues whose substituents are chosen from the group consisting of:

linear or branched aliphatic radicals optionally comprising one or more double bond(s), optionally substituted with carboxyl, $NO_2$, disubstituted protected amino, monosubstituted protected amino, cyano, diazonium, alkoxy, alkoxycarbonyl, alkylcarbonyloxy or optionally fluorinated vinyl radicals or halogen atoms, aryl radicals optionally substituted with carboxyl, $NO_2$, disubstituted protected amino, monosubstituted protected amino, cyano, diazonium, alkoxy, alkoxycarbonyl, alkylcarbonyloxy or optionally fluorinated vinyl radicals or halogen atoms, carboxyl, $NO_2$, disubstituted protected amino, monosubstituted protected amino, cyano, diazonium, alkoxy, alkoxycarbonyl, alkylcarbonyloxy or optionally fluorinated vinyl radicals or halogen atoms.

As regards the optionally fluorinated vinyl radicals, these should be compatible with the envisaged reaction of the diazonium.

The term "functionalized" means in particular that the aromatic or heteroaromatic or aliphatic radicals, when the aromatic or heteroaromatic radicals are substituted with an aliphatic radical, comprise one or more substituent(s) capable of reacting with a substrate or one or more substituent(s) capable of being converted into substituents capable of reacting with a substrate.

These substituents can thus be very varied depending on the applications for which the carbon-containing materials are intended.

Among the substituents capable of reacting directly with a resin, in particular an organic resin, mention may be made, for example, of —$(CH_2)_n$—COOH, —$(CH_2)_n$—$CH_2$—OH and $(CH_2)_n$—$NH_2$ groups, n being an integer between 0 and 10, and —CH=$CH_2$ and —CF=$CF_2$ groups.

Among the precursor substituents which, after conversion, are capable of reacting with a resin, in particular an organic resin, mention may be made, for example, of $NO_2$, $N_2^+$, $(CH_2)_n$—CN, $(CH_2)_n$—CHO and $(CH_2)_n$—COOPr groups, Pr being a protecting group, and $(CH_2)_n$—NHP'r, $(CH_2)_n$—N(P'r)$_2$ and $(CH_2)_n$—N=P''r groups, P'r and P''r being protecting groups and n being an integer between 0 and 10.

Among the substituents capable of reacting directly with a biological molecule, mention may be made of —$(CH_2)_n$—COOH and —$(CH_2)_n$—$NH_2$ groups, n being an integer between 0 and 10.

Among the precursor substituents which, after conversion, are capable of reacting with a biological molecule, mention may be made of $NO_2$, $NO_2$, $N_2^+$, $(CH_2)_n$—CN, $(CH_2)_n$—CHO and $(CH_2)_n$—COPr groups, Pr being a protecting group and n being an integer between 0 and 10.

Among the substituents capable of reacting directly with functional organic molecules, mention may be made of $NO_2$, $(CH_2)_n$—$CONH_2$, $(CH_2)_n$—CN, $(CH_2)_n$—CHO, $(CH_2)_n$—COOH, $(CH_2)_n$—$CH_2OH$ and $(CH_2)_n$—$NH_2$ groups, n being an integer between 0 and 10, and $SO_2H$, $SO_3H$, $SO_2R$ and $SO_3R$ groups, R being an aliphatic or aromatic carbon-containing chain of 1 to 20 carbon atoms.

Among the precursor substituents which, after conversion, are capable of reacting with functional organic molecules, mention may be made of N02, $(CH_2)_n$—$CONH_2$ and $(CH_2)_n$—COOPr groups, Pr being a protecting group, and $(CH_2)_n$—NHP'r, $(CH_2)_n$—N(P'r)$_2$ and $(CH_2)_n$N=P''r groups, P'r and P''r being protecting groups, and $(CH_2)_n$—CN, $(CH_2)_n$—CHO, $(CH_2)_n$—COOH and $(CH_2)_n$—$CH_2OH$ groups, n being an integer between 0 and 10, and $SO_2Pr$ and $SO_3Pr$ groups, Pr being a protecting group chosen from the meanings of R.

Besides the functional substituents, the aromatic or heteroaromatic residues can comprise one or more unreactive substituents such as alkyl or alkenyl radicals.

The term "alkyl radical" or "alkenyl radical" means, in particular, linear or branched radicals comprising 1 to 20 carbon atoms, optionally one or more hetero atom(s), and optionally one or more double bond(s). These radicals can also comprise one or more halogen atom(s). By extension, the radicals also comprise cycloaliphatic radicals.

By way of example, mention is made of the following diazonium salts:

Compound 1: 4-nitrobenzenediazonium tetrafluoroborate

Compound 2: 3,3'-dimethoxybiphenyl-4,4'-bis (diazonium) dichloride of formula:

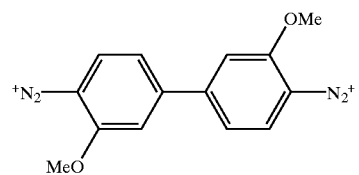

(Fast Blue B crystallized with a molecule of $ZnCl_2$)

Compound 3: 4-carboxymethylbenzenediazonium tetrafluoroborate Compound 4: 1,4-benzenebis (diazonium) tetrafluoroborate Compound 5: chlorobenzyl-4-diazonium tetrafluoroborate.

Other examples of diazonium salts which can be used in the present invention are chosen from 4-chloromethylphenyldiazonium, 4-hydroxymethylphenyldiazonium, 4-carboxyphenyldiazonium, 4-formylphenyldiazonium, 4-acetylphenyldiazonium, 4-isothiocyanatophenyldiazonium, 4-N-FMOC-aminomethylphenyldiazonium, 4-(4-hydroxymethylphenoxymethyl)phenyldiazonium, 4-(2,4-dimethoxyphenyl-N-FMOC-aminomethyl) phenyldiazonium, 4-(phenyl-N-FMOC-aminomethyl) phenyldiazonium, 4-(4-methylphenyl-N-FMOC-aminomethyl)phenyldiazonium and 4-(4-nitrophenylcarbonyl)phenyldiazonium salts, trityldiazonium chloride, 2-chlorotrityldiazonium chloride, trityldiazonium hydroxide, 9-N-FMOC-aminoxanthen-3-yldiazonium, 4-(2,4-dimethoxyphenylhydroxymethyl)phenyldiazonium, 4-(4-hydroxymethylbenzoyloxymethyl) phenyldiazonium, 4-(4-hydroxymethylbenzoylaminomethyl) phenyldiazonium, 4-(4-hydroxymethyl-3-methoxyphenoxymethyl)phenyldiazonium, etc. salts.

The negative electrode consisting of the carbon-containing material should be at a cathode potential value such that it can donate an electron to the diazonium.

This value can be measured relative to a reference electrode and it is thus understood that this potential value will vary depending on the diazonium salt.

In practice, according to one advantageous process, the cathodic reduction of the diazonium salts is carried out by repetitive cyclic voltammetry in a potential range in which they are reduced or by electrolysis at a potential which is more negative than the reduction potential of the diazonium salt.

Among the protic solvents which may be mentioned, for example, are water, methanol, ethanol or mixtures thereof or mixtures with aprotic solvents, for example acetonitrile, it being understood that this resulting mixture has the characteristics of an aprotic solvent.

According to one preferred embodiment, the solution can optionally comprise an electrolyte such as quaternary ammonium salts or alkali metal salts which are soluble in the medium.

Among these salts, mention may be made of quaternary ammonium or alkaline halides, acetates, tetrafluoroborates, perchlorates and hexafluorophosphates, in particular lithium tetrafluoroborate or a ($C_1$–$C_4$) alkylammonium tetrafluoroborate such as tetraethylammonium tetrafluoroborate.

The electrolyte can be simply an acid chosen from hydrochloric acid, sulphuric acid, nitric acid, nitrous acid, phosphoric acid and tetrafluoroboric acid.

The diazonium salt concentration and electrolyte concentration are generally between $10^{-3}$ mol/l and $10^{-1}$ mol/l for the diazonium salt and between $10^{-2}$ mol/l and 1 mol/l for the electrolyte.

The acids can be chosen from inorganic acids such as hydrochloric acid, sulphuric acid, nitric acid, nitrous acid, phosphoric acid or tetrafluoroboric acid, or organic acids. The pH is advantageously less than 2.

The modified carbon-containing materials are recovered and can be characterized in several ways.

Mention is made of cyclic voltammetry, X-ray photoelectron spectroscopy and tunnelling microscopy.

The measurements taken confirm the binding of the Ar groups to the carbon-containing surface. The surface density of the Ar groups depends on the steric bulk of these groups and will thus vary depending on the Ar groups considered.

By way of example, unexpectedly, it has been found that the electrochemical reduction, under the conditions of the invention, of an aromatic diazonium salt comprising one or more nitro substituents leads directly to binding of the aromatic group and conversion of the nitro group(s) into $NH_2$ group(s) according to the following reaction:

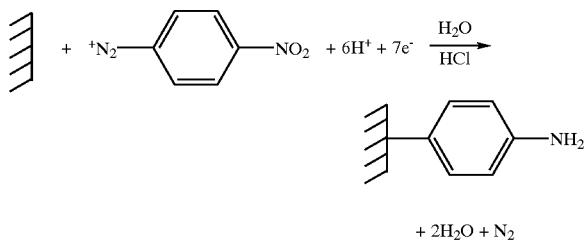

+ $2H_2O + N_2$

By way of example, 4-nitrobenzenediazonium salts are mentioned.

According to another variant, the carbon-containing conductive materials whose surface has been modified by the process according to the invention are subjected to a subsequent conversion of the functional substituents. For example, the substituents may be converted in order to react with a resin, a biological molecule or a functional organic molecule.

The invention thus covers carbon-containing materials converted after the process according to the invention.

The invention also relates to the carbon-containing materials which can be obtained by the process according to the invention.

According to one variant, these modified carbon-containing materials, in particular made of graphite or of glass carbon, are in the form of fibers, powder, felt, fabric, beads or carbon/carbon composite. When the materials are in the form of fibers, one advantageous application consists in producing improved composite materials of fibers/resin such as an epoxy resin.

The invention also relates to carbon-containing materials modified with groups R in which the substituents are capable of covalently binding metal cations, chemical compounds such as complexing agents or biological molecules, such as proteins and in particular enzymes.

According to one advantageous application, the materials at the surface of which are bound functional organic groups capable of reacting with a biological molecule are used for carrying out biological reactions.

According to another advantageous application, the materials at the surface of which are bound functional organic groups capable of reacting with a complexing or functional organic molecule are used for carrying out such reactions.

One more particularly advantageous application is especially the application of the process according to the invention to combinatorial chemistry. Combinatorial chemistry can be defined as the preparation of a set of molecules known as a "library", it being possible for the number of which to range from a few compounds to several thousands. Combinatorial synthesis constitutes a new strategy for systematically and simultaneously generating a very large number of molecules and studying the structure-activity relationship [F. Balkenhohl et al., *Combinatorial Stnthesis of Small Organic Molecules*, Angew. Chem. Int. Ed. Engl., 1996, 35, pp. 2288 –2337].

Combinatorial chemistry is usually carried out on a solid support [J. S. Früchtel and G. Jung, *Organic Chemistry on Solid Supports*, Angew. Chem. Int. Ed. Engl., 1996, 35, pp. 17–42]. To date, the supports most commonly used are polystyrene supports, combined with 1–2% of divinylbenzene or of polystyrene/polyethylene glycol (PEG-PS) copolymer [L. A. Thompson and J. A. Ellman, *Synthesis and Application of Small Molecule Libraries*, Chem. Rev., 1996, 96, pp. 555–600]. Thus, another subject of the present invention is the application of the carbon-containing materials obtained according to the electrochemical process as defined above, in combinatorial chemistry, and more particularly the application of the carbon-containing materials at the surface of which are bound organic groups capable of reacting with functional organic molecules to make a library of organic compounds. Such a use is particularly advantageous in the sense that it constitutes an alternative to conventional polymer supports.

In practice, such a use consists in grafting functionalized organic groups as defined above onto a carbon-containing material according to the electrochemical reduction process of the present invention, and then in reacting the said organic groups with various functional organic molecules in order to make a combinatorial chemistry library, and finally in cleaving the compounds obtained from the surface of the carbon-containing material.

The reactions between the organic groups grafted onto the carbon-containing material and the functional organic molecules are all compatible reactions which are known to those skilled in the art.

The carbon-containing materials which can be used more particularly in combinatorial chemistry are those which have an optimum working surface. For example, mention may be made of carbon felts.

In this specific case of the use of the process according to the present invention in combinatorial chemistry, it is understood that it is not limited to the grafting of specific compounds, provided that it concerns an organic diazonium salt in solvent. Many compounds can thus be applied to combinatorial chemistry on a carbon-containing support. Mention may be made, for example, of the following salts: 4-chloromethylphenyldiazonium, 4-hydroxymethylphenyldiazonium, 4-carboxyphenyldiazonium, 4-formylphenyldiazonium, 4-acetylphenyldiazonium, 4-isothiocyanatophenyldiazonium, 4-N-FMOC-aminomethylphenyldiazonium, 4-(4-hydroxymethylphenoxymethyl)phenyldiazonium, 4-(2,4-dimethoxyphenyl-N-FMOC-aminomethyl) phenyldiazonium, 4-(phenyl-N-FMOC-aminomethyl) phenyldiazonium, 4-(4-methylphenyl-N-FMOC-aminomethyl)phenyldiazonium and 4-(4-nitrophenylcarbonyl)phenyldiazonium salts, trityldiazonium chloride, 2-chlorotrityldiazonium chloride, trityldiazonium hydroxide, 9-N-FMOC-aminoxanthen-3-yldiazonium, 4-(2, 4-dimethoxyphenylhydroxymethyl)phenyldiazonium, 4-(4-hydroxymethylbenzoyloxymethyl)phenyldiazonium, 4-(4-hydroxymethylbenzoylaminomethyl)phenyldiazonium, 4-(4-hydroxymethyl-3-methoxyphenoxymethyl)phenyldiazonium, etc. salts.

Other molecules which can be used are also cited in P. H. H. Hermkens et al., *Solid-Phase Reactions: A Review of the Recent Literature*, Tetrahedron, 1996, Vol. 52, pp. 4527–4554, and P. H. H. Hermkens et al., *Solid-Phase Reactions II : A Review of the Literature* November 95–November 96, Tetrahedron, 1997, Vol. 53, pp. 5643–5678.

Among the modified carbon-containing materials which may be mentioned, for example, are those in which the group R corresponds to the formula Ar, Ar being an optionally substituted $C_6$–$C_{14}$ aromatic group or a heteroaromatic group of 5 to 14 optionally substituted atoms comprising one or more hetero atoms chosen from oxygen, nitrogen, sulphur and phosphorus.

The detailed description of these groups is given in the process section of the account of the invention.

According to one variant, the groups Ar are substituted with SH, $SO_2H$, $SO_3H$, $SO_2R$ or $SO_3R$ radicals.

The invention also relates to modified carbon-containing materials made in particular of carbon black, of highly oriented pyrolytic graphite (HOPG) or of glass carbon, which are, according to one variant, in the form of fibers, powders, felt, fabric, beads or carbon/carbon composites.

Preferably, the fibers comprise substituents capable of reacting covalently with radicals present on an organic resin intended to be combined with the said fibers in the form of composite materials.

Needless to say, the nature of these substituents is generally very varied and depends on the organic resin considered.

The invention also relates to the composite materials comprising an organic resin matrix reinforced with modified carbon fibers according to the invention.

The matrix of a composite material can be a thermosetting polymer such as an epoxy resin, or a thermoplastic resin, for example a polyamide, polyethylene or polytetrafluoroethylene resin.

Among the substituents capable of reacting directly with a biological molecule, mention may be made, by way of example, of COOH and $NH_2$ groups.

The process according to the invention can be carried out using a known electrolysis cell, such as the one described in patent EP-B-569,503, FIG. 1 and description page 8, lines 12 to 25, the content of which is incorporated by reference, or using a cell comprising separate compartments.

The examples below illustrate the invention.

All the examples are carried out in an electrolysis cell into which is introduced an electrolyte solution and one of the following diazonium salts:

Compound 1: 4-nitrobenzenediazonium tetrafluoroborate

Compound 2: 3,3'-dimethoxybiphenyl-4,4'-bis(diazonium) dichloride of formula:

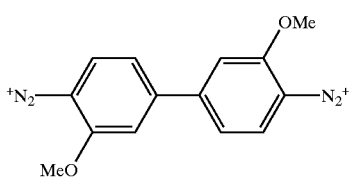

(Fast Blue B crystallized with a molecule of $ZnCl_2$)

Compound 3: 4-carboxymethylbenzenediazonium bis(tetrafluoroborate)

Compound 4: 1,4-benzenebis(diazonium) bis(tetrafluoroborate)

Compound 5: chlorobenzyl-4-diazonium tetrafluoroborate.

The acidic aqueous medium used as solvent is water in the presence of hydrochloric acid, sulphuric acid or nitric acid. In most cases, the acid serves as electrolyte.

The experiments are carried out on glass carbon (GC) electrodes.

The attached figures, which form an integral part of the description, represent cyclic voltamograms of the experiments carried out with the various compounds:

FIGURES

FIGS. 1a and 1b:

Cyclic voltammetry of compound 1 in 0.1 M sulphuric acid, on GC electrode, sweep speed 0.2 V/s; concentration of compound 1: 1.5 mM (FIG. 1a), 1 mM (FIG. 1b); saturated calomel reference electrode (SCE); temperature at 20° C.

FIG. 2:

a) Grafting of a GC electrode in a 5 mM solution of 4-nitrobenzenediazonium tetrafluoroborate 1 in 0.1 N HCl .

b) Voltamogram of the same electrode transferred into acetonitrile (ACN)+0.1 M $NEt_4ClO_4$ c) Voltamogram of nitrobenzene in ACN+0.1 M $NEt_4ClO_4$ on a GC electrode. Sweep speed 0.2 V/s; SCE reference.

FIG. 3:

a) Voltamogram of 4-nitrophenyldiazonium tetrafluoroborate 1 (c=2 mM) on carbon fiber in 0.1 N HCl b) Same carbon fiber after grafting (1 minute at the potential of the wave A), rinsing and transfer into an ACN+0.1 M $NEt_4ClO_4$ solution.

FIG. 4:

Voltamogram of compound 2 (c=1 mM) in 0.1 M HCl on GC electrode. Sweep speed 0.2 V/SCE.

FIG. 5:

Linear cyclic voltammetry on a glass carbon electrode in a solution of $2\times10^{-3}$ M 4-(amino)benzyldiazonium chloride salt+0.1 M tetrabutylammonium tetrafluoroborate+0.1 M hydrochloric acid in acetonitrile. Sweep speed v=200 mV.s$^{-1}$. Curve 1=first sweep, curve 2=second sweep.

FIG. 6:

X-ray photoelectron spectroscopy of the sample of glass carbon plates 1.

FIG. 7:

X-ray photoelectron spectroscopy of the sample of glass carbon plates 2.

EXAMPLES

Example 1

A solution of diazonium 1 at a concentration of 1.5 mM in acidic aqueous medium (0.1 M $H_2SO_4$ or 0.1 N HCl) is subjected to repetitive cyclic voltammetry in the range of the reduction potential of the diazonium salt at a temperature of 20° C. and at a scanning speed of 0.2 V/s.

Under these conditions, 1 shows (FIG. 1b) a first irreversible wave (A) at about 0.1 V/SCE; this wave is broad (width at mid-height 160 mV) and its height corresponds to the transfer of 1 electron (by comparison with the reversible wave of ferrocene). This wave is followed by a second irreversible wave (B) at −0.43 V/SCE corresponding to the consumption of 6 electrons. During the return sweep, an anodic wave (C) appears (Ep(C)=+0.38 V/SCE) to which corresponds a cathodic wave (D) during the second sweep (Ep(D)=+0.30 V/SCE). A similar voltamogram is observed in 0.1 N HCl. The monoelectronic wave A is at about −0.14 V/SCE and the wave B (6 electrons) is at about −0.69 V/SCE.

These voltamograms can be interpreted in the following way: by comparison with the results obtained in aprotic medium and with the results described by polarography, the wave A can be attributed to the reaction:

Whereas the wave B can be attributed to the reduction of nitrobenzene into aniline according to the standard mechanism described in protic medium:

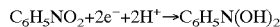

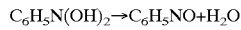

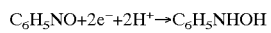

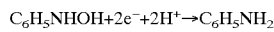

In the case studied, the signal corresponds both to the nitrobenzene formed in solution and to the nitrobenzene group grafted onto the surface. The C/D system can be attributed to the phenylhydroxylamine/nitrosobenzene couple. During a second sweep (FIG. 1(b), curve 2), the wave A of 4-nitrophenyldiazonium tetrafluoroborate, corresponding to the reduction of the diazonium function, has disappeared. This phenomenon was already observed during the reduction of diazonium salts in aprotic medium and is observed every time there is grafting of the carbon surface. The decrease of the wave B is also noted during successive sweeps, which indicates that the 4-nitrophenyl groups grafted onto the surface are gradually reduced to 4-aminophenyl groups (which have no reduction wave).

Figure 2:
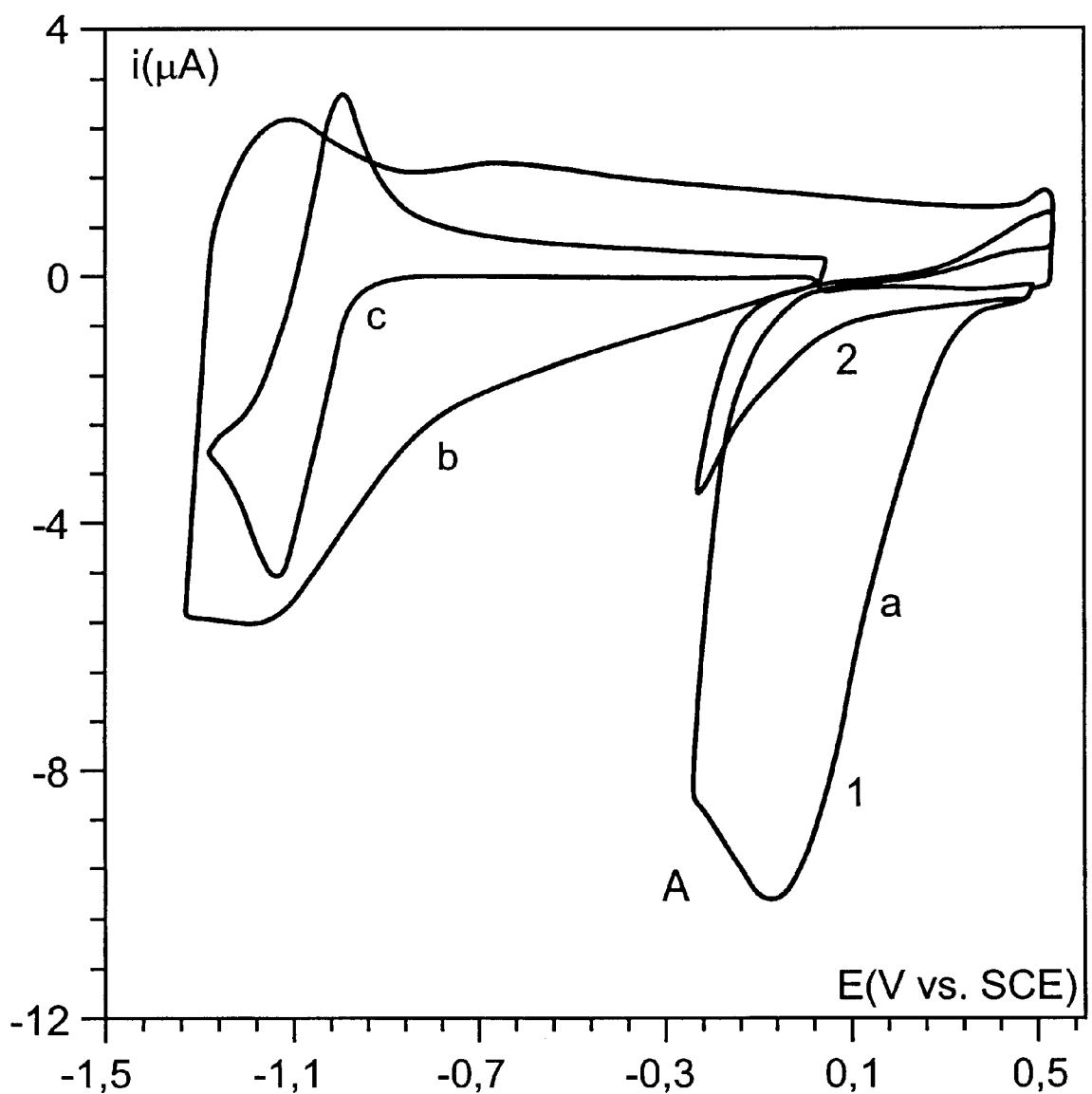

If the potential of the glass carbon electrode is held at −0.25 V/SCE (more cathodic than that of the wave A) (FIG. 2(a)) for one minute, in a 5 mM solution of 4-nitrobenzenediazonium tetrafluoroborate in 0.1 N HCl, the electrode is washed thoroughly with water, with alcohol and with acetone (5 minutes in an ultrasound tank in each solvent) and it is then transferred into a solution of ACN+0.1 M NEt$_4$ClO$_4$, (FIG. 2(b)), then the reversible signal of the 4-nitrophenyl group is observed at about E°=−1.15 V/SCE, i.e. at the same potential as that of the nitrobenzene itself (FIG. 2(c)).

This reversible system decreases during the successive sweeps (probably following protonation of the nitrobenzene radical anion with residual proton donors in the solution).

This set of results shows that, in an acidic aqueous medium, grafting of a 4-nitrophenyl group is observed as follows:

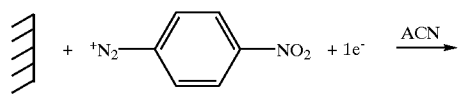

-continued

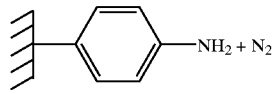

When the electrode is transferred into ACN+0.1 M NEt$_4$ClO$_4$, the same reversible voltamogram due to the grafted 4-nitrophenyl group as that which is observed when the grafting is carried out in ACN medium is observed. On the other hand, if the electrode is left in acidic aqueous medium, six-electron reduction of the nitro group into an amino group is observed during the cathodic sweep:

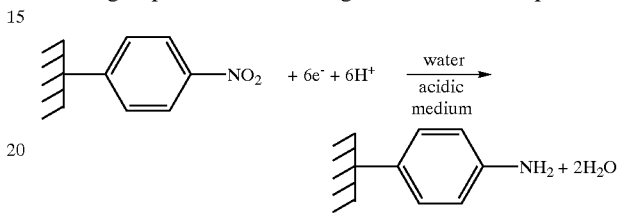

according to the mechanism described above.

The grafting can be confirmed by X-ray photoelectron spectroscopy (XPS). Table 1 shows the XPS analysis of a clean, untreated GC plate and of the same plate electrolysed at −0.1 V/SCE in a solution of 5 mM 4-nitrobenzenediazonium tetrafluoroborate in 0.1 N HCl and rinsed thoroughly with water, ethanol and acetone (five minutes in an ultrasound tank in each solvent).

TABLE 1

XPS analyses of GC plates

| Element | C % | O % | N % | N % | Cl % |
|---|---|---|---|---|---|
| Peaks (eV) | 285 | 533 | 400 | 406 | 201 |
| Clean plate | 95 | 5 | 0.2 | 0 | 0 |
| Plate grafted in 0.1 N HCl | 84 | 10 | 2.6 | 2.4 | 0 |
| Plate grafted and then treated with epichlorohydrin | 81 | 15 | 1.6 | 0.8 | 1.2 |

Appearance of the peak 406 eV corresponding to the grafted NO$_2$ group, and also of the peak 400 eV corresponding to the NH$_2$ group, are observed between the clean plate and the grafted plate. The latter increase shows that at −0.1 V/SCE, some of the NO$_2$ groups are already reduced to NH$_2$, as might be expected on examination of FIG. 1b, in which the foot of the wave of reduction of the nitro group is already reached at −0.1 V/SCE.

Figure 3:
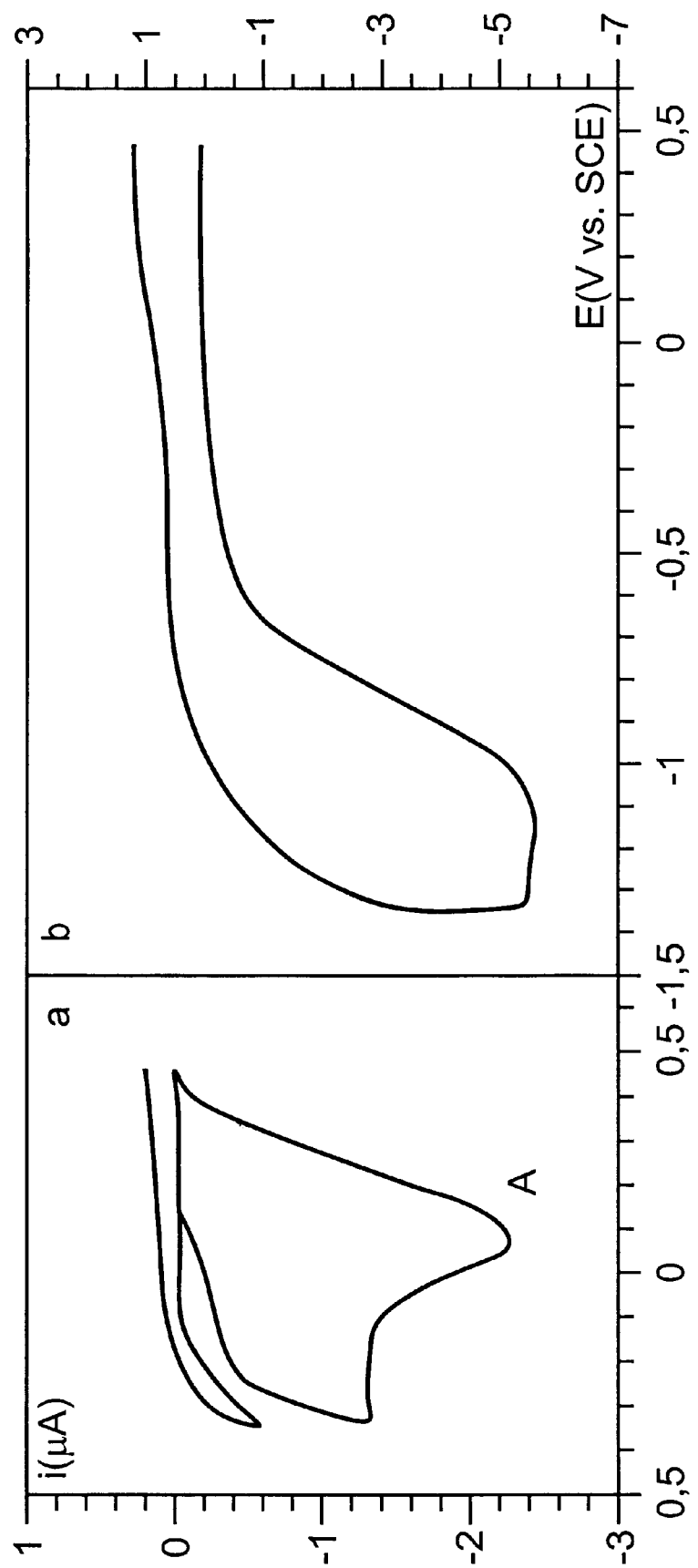

Similar results can be obtained on carbon fibers. By cyclic voltammetry in 0.1 N HCl on a lock containing a few fibers (FIG. 3a), the first wave of the diazonium in (A) is observed at about −0.1 V/SCE. The lock of fibers is grafted at this potential for 1 minute, rinsed as previously in an ultrasound tank and then transferred into an ACN +0.1 M NEt$_4$ClO$_4$ solution. An irreversible wave then appears (FIG. 3b), corresponding to the 4-nitrophenyl group (the irreversibility of the wave is probably due to a residual acidity of the surface of the fiber). The wave for the 4-nitrophenyl group disappears during the successive sweeps, as was already noted on a GC electrode.

TABLE 2

XPS analysis of carbon fibres

| Element | C % | C % | N % | N % | Cl % |
|---|---|---|---|---|---|
| Peaks (eV) | 285 | 533 | 400 | 406 | 201 |
| Clean plate | 80 | 20 | 0 | 0 | 0 |
| Plate grafted in 0.1 N HCl | 86 | 10.5 | 2 | 1 | 0 |
| Plate grafted and then treated with epichlorohydrin | 73 | 23 | 1.2 | 0.1 | 3.7 |

By XPS (Table 2), the appearance of nitrogen peaks corresponding to $NH_2$ at 400 eV and $NO_2$ at 406 eV is observed.

The GC plates and the carbon fibers grafted by electrolysis of 1 in acidic aqueous medium and in which at least some of the nitro groups have been reduced to amino groups during the grafting can be treated with epichlorohydrin to show that the amino groups are indeed capable of reacting with epoxy groups according to the reaction:

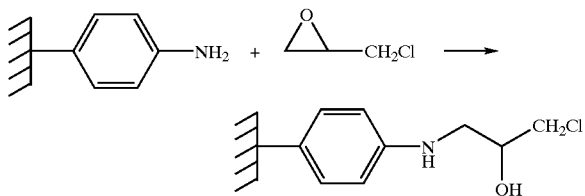

The $Cl_{2p}$ signal (which appears in the form of two peaks on account of spin-orbital couplings) should be readily identifiable on the XPS spectra of carbon-containing surfaces. In effect, the appearance of the two peaks corresponding to the $Cl_{2p}$ after the plates or 5 fibers, which have been pregrafted in 0.1 M HCl, have been treated with boiling epichlorohydrin for ten hours is observed.

Example 2

Grafting of a bis(Diazonium) Salt

The reaction is represented schematically in the following way:

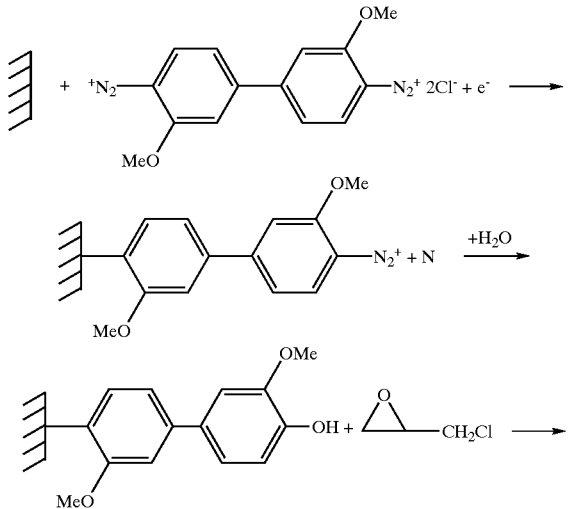

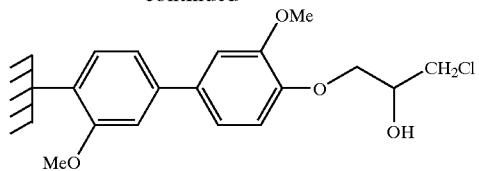

Cyclic Voltammetry of Compound 2

In $ACN+0.1$ M $NEt_4ClO_4$, compound 2 shows a very broad wave (width at mid-height 300 mV) at −0.1 V/SCE, corresponding to the transfer of two electrons. This broad, bielectronic wave can be interpreted as the successive reduction of the two diazonium functions at two close but offset potentials. A similar voltamogram is observed in 0.1 M HCl (FIG. 4) with a peak at about −0.3 V/SCE.

Figure 4:
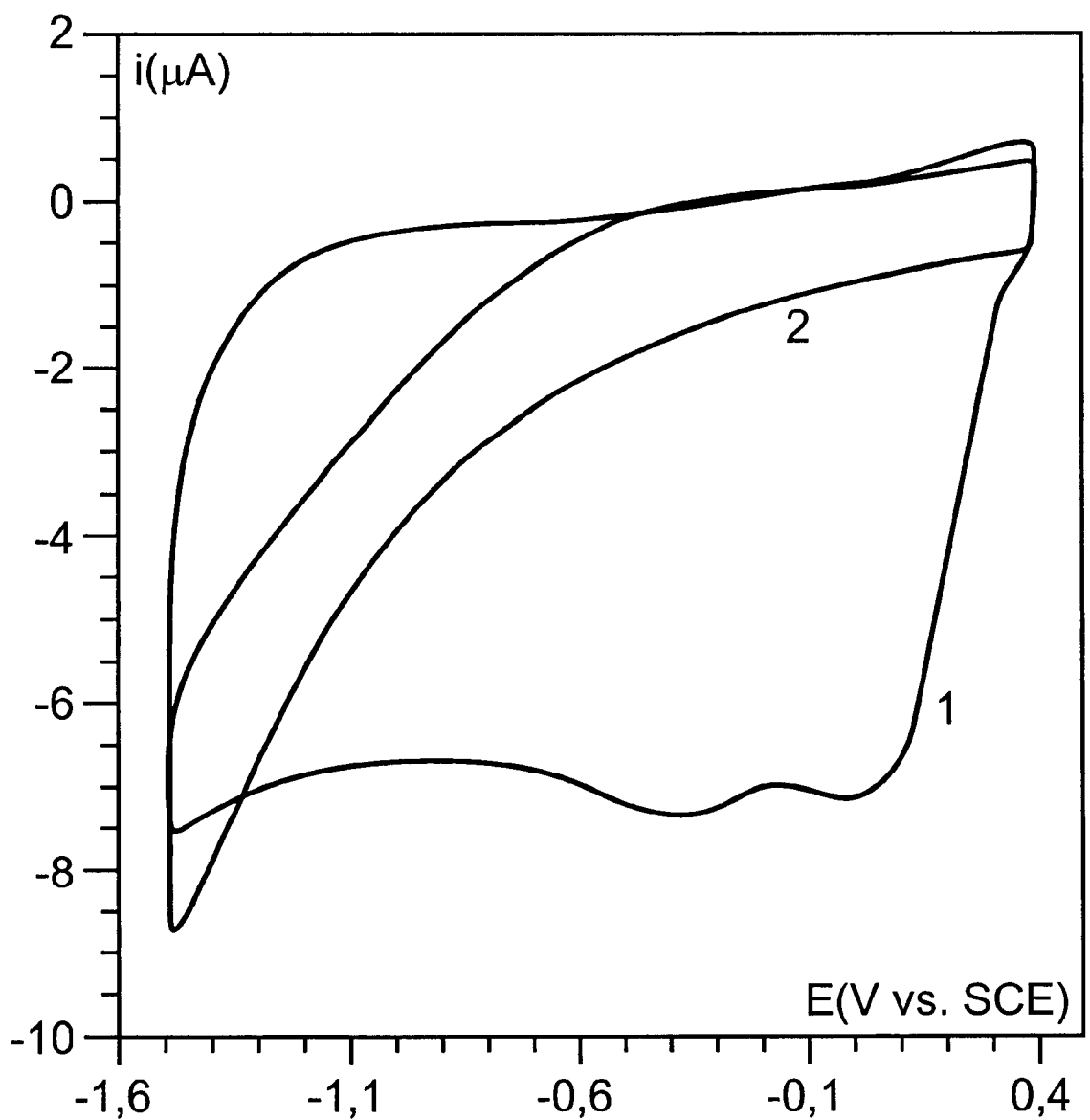

At the second sweep, the wave has disappeared, as is observed each time that there is grafting (FIG. 4, curve 2). In order to observe the presence of aromatic groups on the surface of the carbon, the glass carbon electrode was treated with a nitrating mixture (concentrated $HNO_3$+concentrated $H_2SO_4$). In this case, after thorough rinsing and transfer of the electrode into $ACN+0.1$ M $NEt_4ClO_4$, a peak is observed at −1.35 V/SCE, the position of which is compatible with that of a nitroaryl group (for example 4-nitroanisole is reduced at −1.25 V/SCE under the same conditions). By grafting compound 2, it was confirmed that this signal does not appear if the electrode is not premodified.

The grafting of a GC plate can also be monitored by XPS (Table 3):

TABLE 3

XPS analysis of a GC plate grafted with compound 2

| Element | C % | O % | N % | Cl % |
|---|---|---|---|---|
| Peaks (eV) | 285 | 533 | 400 | 201 |
| Clean plate | 94 | 5 | 0.6 | 0.1 |
| Plate grafted in 0.1 N HCl | 85 | 13 | 1.5 | 0.2 |
| Plate grafted and then treated with epichlorohydrin | 80 | 17.5 | 0.8 | 1.7 |

The clean plate is grafted in 0.1 N HCl for 30 minutes, rinsed thoroughly as previously and then treated with boiling epichlorohydrin for 10 hours. An increase in the nitrogen peak is observed during grafting of compound 2, but at the same, an increase in the oxygen peak is observed, which appears to indicate an at least partial hydrolysis of the diazonium function not grafted during the treatment. During the reaction with epichlorohydrin, an appreciable increase in the peak corresponding to chlorine is observed, indicating that the reaction has indeed taken place.

Example 3

Grafting of an Aryl Carboxylic Group

It is also shown that it is possible to graft phenylcarboxylic or phenylacetic groups:

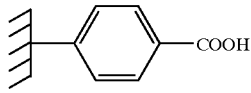

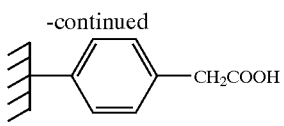

These carboxylic groups can react with the amino groups of the resin curing agent (such as diaminodiphenyl sulphone: DDS) according to the reaction below: it being possible for the terminal amino group in turn to react with the epoxy function of the resin.

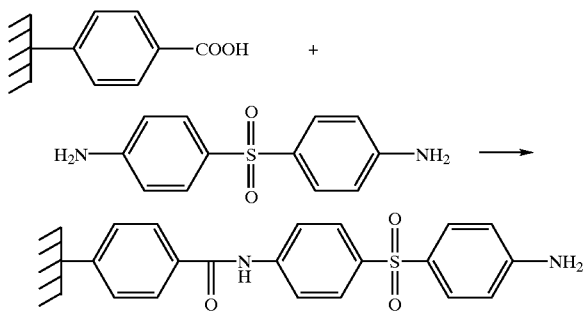

In 0.1 N hydrochloric acid, the voltamogram of diazonium tetrafluoroborate of 4-phenylacetic acid 3 shows, in reduction an irreversible peak at about –0.8 V/SCE:

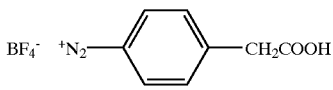

Example 4

Study of the Grafting of Compound 5

Study of the Grafting by Cyclic Voltammetry

Figure 5:
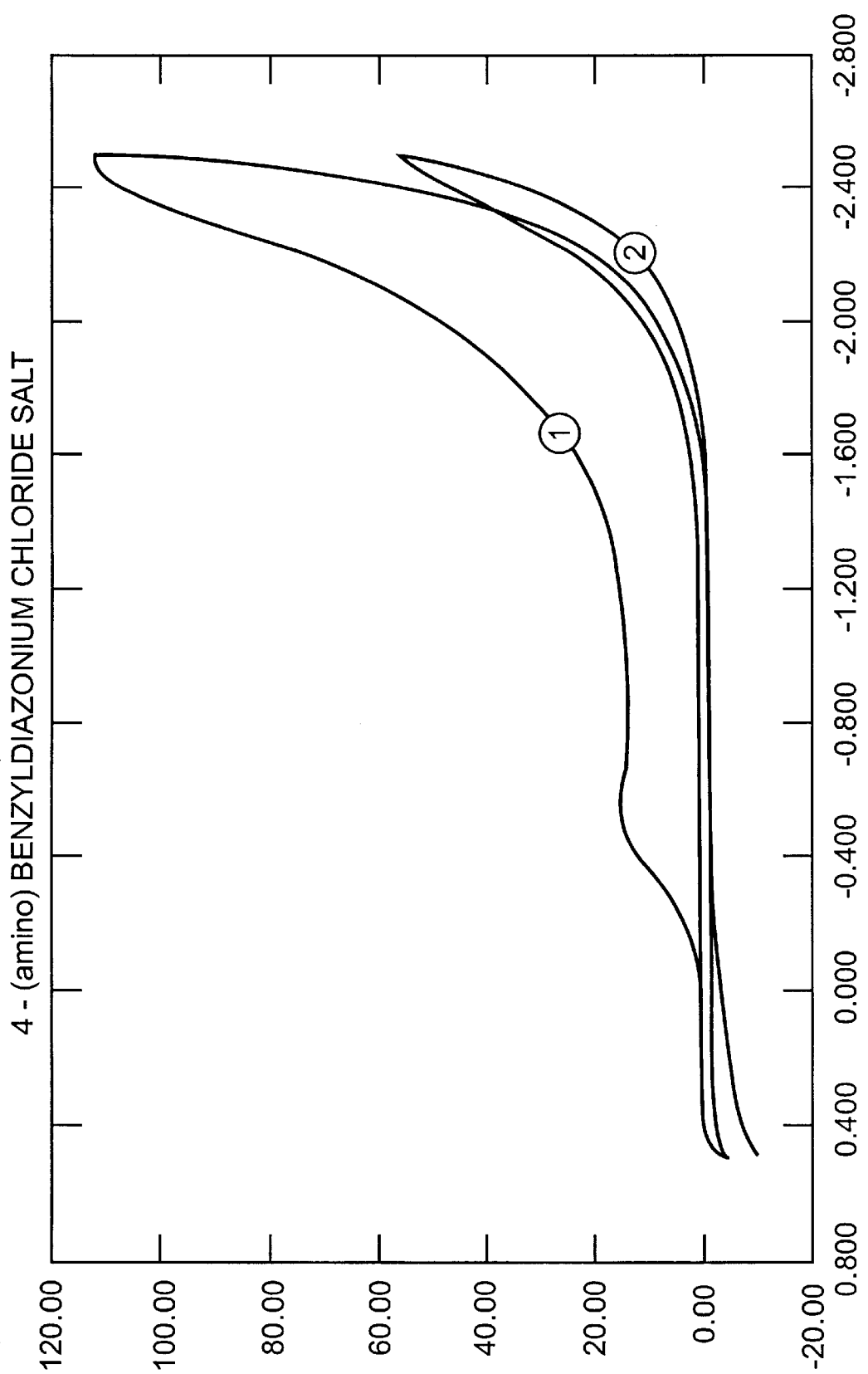

The voltamogram of a glass carbon electrode which is carefully polished and then rinsed by ultrasound in acetone and then ethanol is plotted in a solution of $2 \times 10^{-3}$ M 4-(amino)benzyldiazonium chloride salt+0.1 M tetrabutylammonium tetrafluoroborate in acetonitrile, at a sweep speed $v=200$ mV.s$^{-1}$. The curve comprises an irreversible wave with a peak potential value Ep=–0.53 V/SCE, which disappears from the second sweep onwards (FIG. 5).

Study of Grafting on Glass Carbon Plates

Two samples of glass carbon plates grafted by reduction of the 4-(amino)benzyldiazonium chloride salt are prepared in the following way: After careful polishing and washing with ultrasound in acetone and then ethanol, each of the glass carbon plates is grafted for 5 minutes at a potential of –0.53 V/SCE, in a solution of $2 \times 10^{-3}$ M 4-(amino)benzyldiazonium chloride salt+0.1 M tetrabutylammonium tetrafluoroborate+0.1 M hydrochloric acid in acetonitrile.

Figure 6:
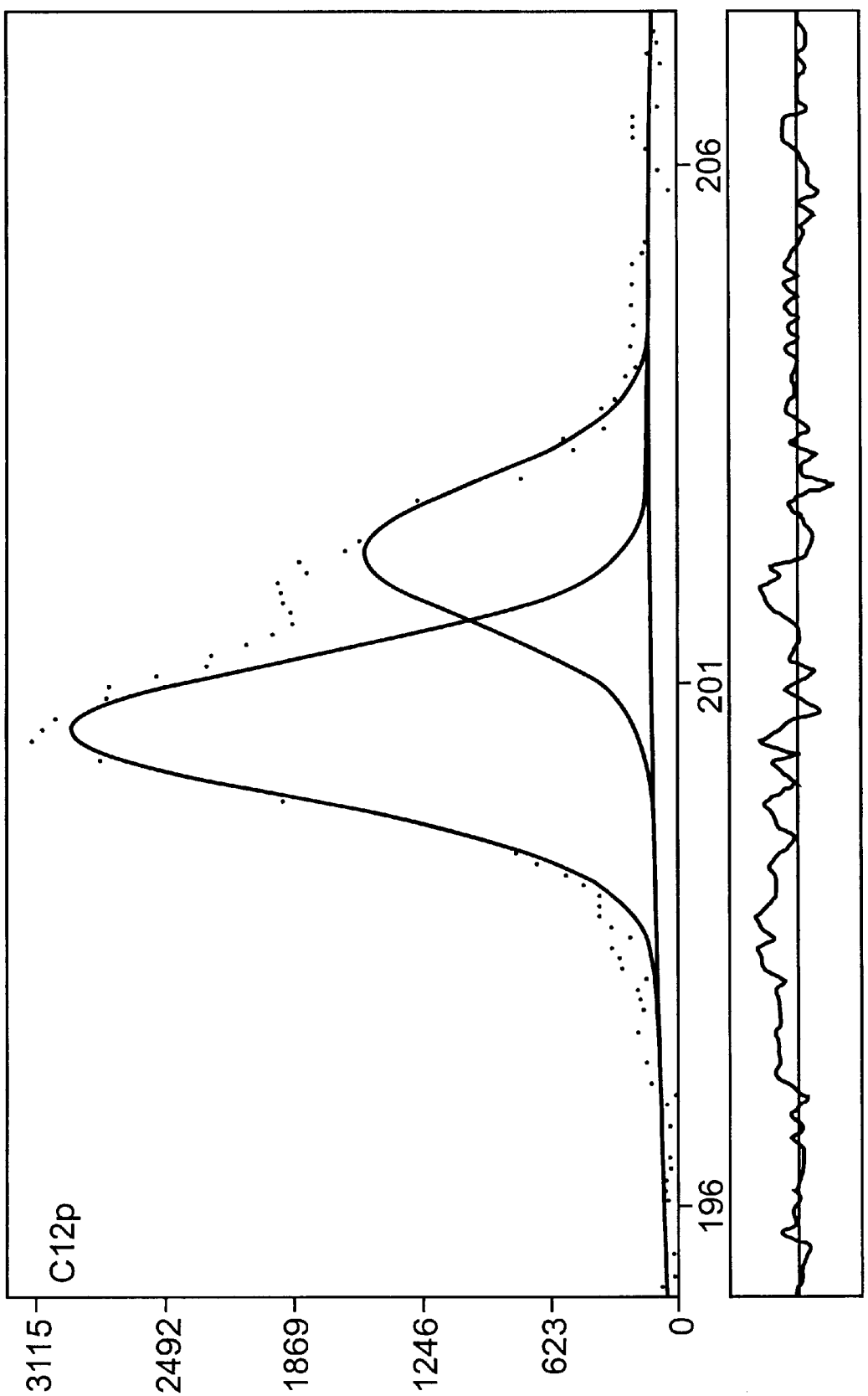
Figure 7:
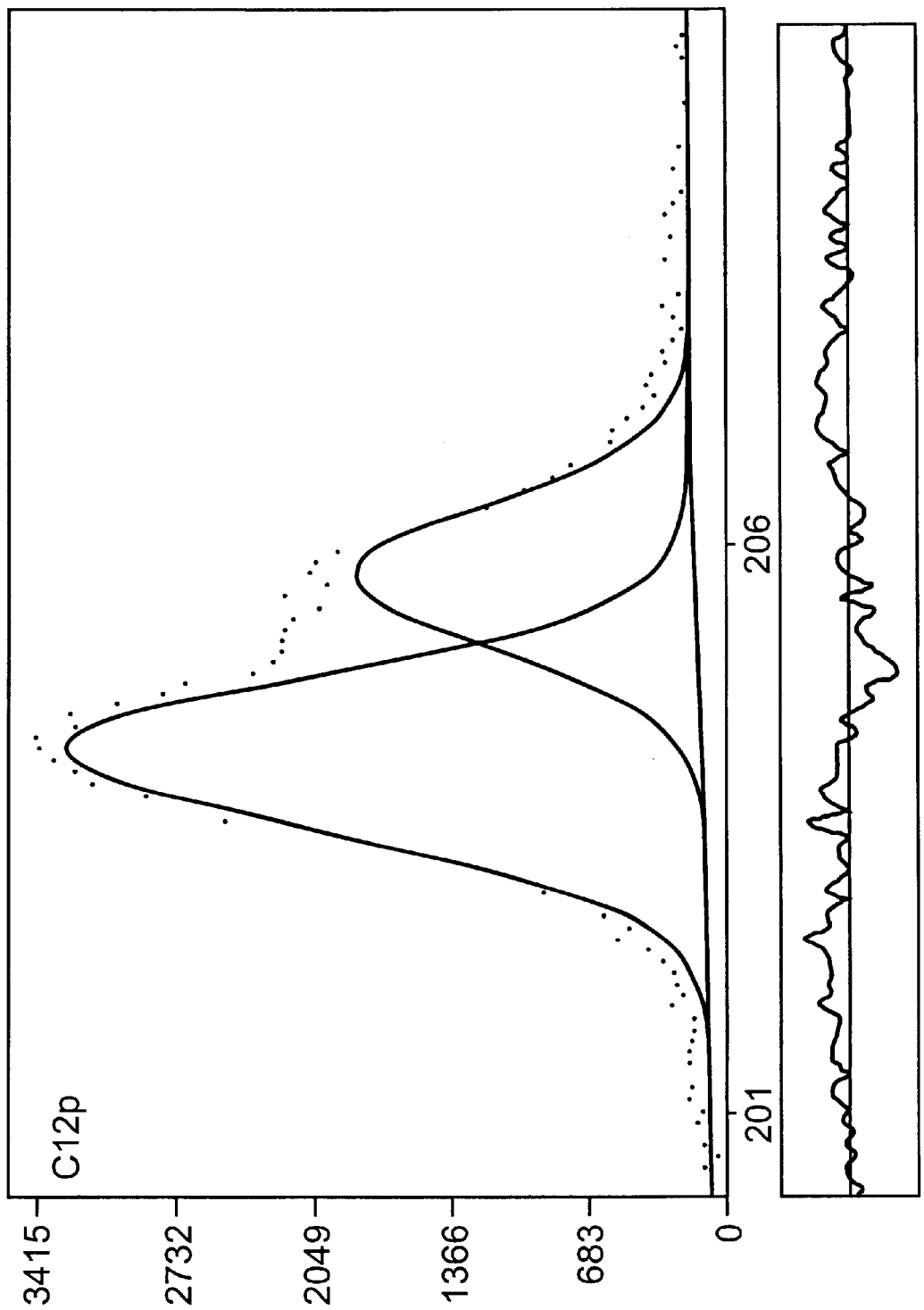

The grafting is then characterized by X-ray photoelectron spectroscopy (FIGS. 6 and 7). The surface of the samples shows a carbon content of 91%, an oxygen content of 6.4% and a chlorine content of 2.6% after grafting. These results show that the grafting of the 4-(amino)benzyldiazonium chloride salt has indeed taken place, according to the following scheme:

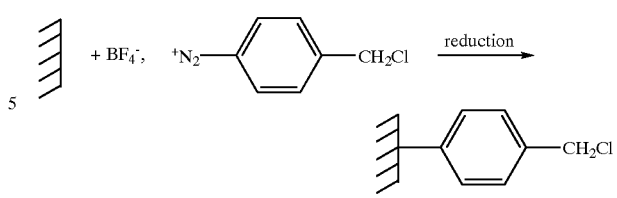

What is claimed is:

1. Process for preparing, by electrochemical reduction, a carbon-containing material whose surface is modified with organic groups, this process comprising placing the carbon-containing material in contact with an organic diazonium salt in solvent, optionally in the presence of an electrolyte, and negative polarization of the carbon-containing material relative to an anode which is also in contact with the solution of the organic diazonium salt or in contact with an electrolytic solution which is separate from the solution of the said salt, wherein the electrochemical reduction is carried out on an organic diazonium salt in protic solvent in acidic medium.

2. The process according to claim 1, wherein the organic diazonium salt corresponds to the formula:

$$ArN_2^+X^- \quad (I)$$

in which:

Ar is a $C_6$–$C_{14}$ aromatic residue optionally functionalized with one or more substituents or a heteroaromatic residue of 5 to 14 atoms, optionally functionalized with one or more substituents, comprising one or more hetero atoms selected from the group consisting of oxygen, nitrogen, sulphur and phosphorus, and $X^-$ is an anion.

3. The process according to claim 2, wherein the substituents are selected from the group consisting of:

linear or branched aliphatic radicals optionally comprising one or more double or triple bond(s), optionally substituted with carboxyl, $NO_2$, disubstituted protected amino, monosubstituted protected amino, cyano, diazonium, alkoxy, alkoxycarbonyl, alkylcarbonyloxy or optionally fluorinated vinyl radicals or halogen atoms, aryl radicals optionally substituted with carboxyl, $NO_2$, disubstituted protected amino, monosubstituted protected amino, cyano, diazonium, alkoxy, alkoxycarbonyl, alkylcarbonyloxy or optionally fluorinated vinyl radicals or halogen atoms, and carboxyl, $NO_2$, disubstituted protected amino, monosubstituted protected amino, cyano, diazonium, alkoxy, alkoxycarbonyl, alkylcarbonyloxy or optionally fluorinated vinyl radicals or halogen atoms.

4. The process according to claim 3, wherein said organic group is functionalized with one or more substituents capable of reacting directly with a substrate or with one or more precursor substituents which, after conversion, are capable of reacting with a substrate, the said substrate being selected from the group consisting of organic resins, biological molecules, chemical molecules and complexing agents.

5. The process according to claim 4, wherein the substituents capable of reacting directly with an organic resin are selected from the group consisting of—$(CH_2)_n$—COOH, —$(CH_2)_n$—$CH_2$—OH and $(CH_2)_n$—$NH_2$ groups, n being an integer between 0 and 10, and in that the precursor substituents capable of reacting, after conversion, with an organic resin are selected from the group consisting of $NO_2$, $N_2^+$, $(CH_2)_n$—CN, $(CH_2)_n$—CHO and $(CH_2)_n$—COOPr groups, Pr being a protecting group, and $(CH_2)_n$—NHP'r, $(CH_2)_n$—N(P'r)$_2$ and $(CH_2)_n$—N=P"r groups, P'r and P"r being protecting groups and n being an integer between 0 and 10.

6. The process according to claim 4, wherein the substituents capable of reacting directly with a biological molecule are selected from the group consisting of $(CH_2)_n$—COOH and $(CH_2)_n$—$NH_2$ groups, n being an integer between 0 and 10, and in that the precursor substituents capable of reacting, after conversion, with a biological molecule are selected from the group consisting of $NO_2$, $N_2^+$, $(CH_2)_n$—CN, $(CH_2)_n$—CHO and $(CH_2)_n$—COOPr groups, Pr being a protecting group and n being an integer between 0 and 10.

7. The process according to claim 4, wherein the substituents capable of reacting directly with functional organic molecules are selected from the group consisting of $NO_2$, $(CH_2)_n$—$CONH_2$, $(CH_2)_n$—CN, $(CH_2)_n$—CHO, $(CH_2)_n$—COOH, $(CH_2)_n$—$CH_2OH$ and $(CH_2)_n$—$NH_2$ groups, n being an integer between 0 and 10, and $SO_2H$, $SO_3H$, $SO_2R$ and $SO_3R$ groups, R being an aliphatic or aromatic carbon-based chain of 1 to 20 carbon atoms and in that the precursor substituents capable of reacting, after conversion, with functional organic molecules are selected from the group consisting of $NO_2$, $(CH_2)_n$—$CONH_2$ and $(CH_2)_n$—COOPr groups, Pr being a protecting group, and $(CH_2)_n$—NHP'r, $(CH_2)_n$—N(P'r)$_2$ and $(CH_2)_n$N=P"r groups, P'r and P"r being protecting groups, and $(CH_2)_n$—CN, $(CH_2)_n$—CHO, $(CH_2)_n$—COOH and $(CH_2)_n$—$CH_2OH$ groups, n being an integer between 0 and 10, and $SO_2Pr$ and $SO_3Pr$ groups, Pr being a protecting group chosen from the meanings of R.

8. The process according to claim 1, wherein the protic solvent is selected from the group consisting of water, methanol, ethanol and mixtures thereof.

9. The process according to claim 8, wherein the protic solvent is in a mixture with an aprotic solvent, it being understood that the mixture has the characteristics of an aprotic solvent.

10. The process according to claim 1, wherein the acid is selected from the group consisting of sulphuric acid, hydrochloric acid, nitric acid, nitrous acid, phosphoric acid and tetrafluoroboric acid.

11. The process according to claim 1, wherein the pH of the solution is less than 2.

12. The process according to claim 1, wherein the electrochemical reduction is carried out by repetitive cyclic voltammetry at a value in which the diazonium salts are reduced or by electrolysis at a potential which is more negative than the reduction potential of the diazonium salts.

13. The process according to claim 1, wherein the diazonium salt concentration is between $10^{-3}$ and $10^{-1}$ mol/l.

14. Process for the electrochemical production of a carbon-containing material whose surface is modified with aromatic amino groups, according to claim 1, wherein the diazonium salt is substituted with a nitro radical and in that the electrochemical reduction is maintained up to the reduction of the nitro radical into an amino radical.

15. The process according to claim 1, wherein the carbon-containing material is in the form of fibers, powder, felt, fabric or carbon/carbon composite.

16. The process according to claim 1, wherein the modified carbon-containing materials are subjected to a subsequent conversion of the functional substituents.

17. Carbon-containing material modified at the surface with optionally functionalized organic groups, which can be obtained by the process according to claim 1.

18. The material according to claim 17, further comprising carbon fibers or a carbon-containing material in the form of powder or a carbon-containing material in the form of felt, fabric, beads or carbon/carbon composite.

19. Composite material formed from an organic resin reinforced with fibers of carbon-containing material according to claim 18, the surface of which has been modified with organic groups functionalized with substituents capable of reacting directly, or after conversion, with an organic resin.

20. The process according to claim 1, wherein the surface of the carbon-containing material is modified with functionalized organic groups.

21. A method for carrying out at least one biological reaction comprising contacting a biological material of interest with a carbon-containing material modified at the surface with bound organic groups capable of reacting with the biological material of interest.

22. The method according to claim 21, wherein the bound organic groups are capable of reacting with at least one of a metal cation, a functionalized organic molecule, and a complexing agent.

23. A method of making a combinatorial chemistry library of organic compounds comprising:

contacting a carbon-containing material with an organic diazonium salt in solvent, optionally in the presence of an electrolyte, negatively polarizing the carbon-containing material relative to an anode which is also in contact with the solution of the organic diazonium salt or in contact with an electrolytic solution which is separate from the solution of the salt, electrochemically reducing the organic diazonium salt in protic solvent in acidic medium, and setting a cathode potential at a value such that it can donate an electron to the diazonium.

24. The method according to claim 23, wherein said carbon-containing material is modified at its surface with bound organic groups capable of reacting with functional organic molecules.

25. The method according to claim 24, wherein the organic groups undergo one or more chemical and/or electrochemical conversions and are then cleaved from the carbon-containing material.

* * * * *